(12) United States Patent
Mauro (10) Patent No.: US 6,705,019 B2
(45) Date of Patent: Mar. 16, 2004

(54) GONIOMETER

(76) Inventor: George Mauro, 26 Keewaydin Dr., Suite B, Salem, NH (US) 03079

( * ) Notice: Subject to any disclaimer, the term of this patent is extended or adjusted under 35 U.S.C. 154(b) by 0 days.

(21) Appl. No.: 10/159,900

(22) Filed: May 30, 2002

(65) Prior Publication Data

US 2002/0148131 A1 Oct. 17, 2002

Related U.S. Application Data

(63) Continuation-in-part of application No. PCT/US02/02648, filed on Jan. 30, 2002.
(60) Provisional application No. 60/267,274, filed on Feb. 8, 2001.

(51) Int. Cl.[7] ............................................. B23Q 16/00
(52) U.S. Cl. ............................ 33/569; 33/568; 269/60
(58) Field of Search ...................... 33/1 M, 568, 569, 33/570, 573; 269/60, 75

(56) References Cited

U.S. PATENT DOCUMENTS

| 3,046,006 | A | 7/1962 | Kulicke, Jr. |
| --- | --- | --- | --- |
| 3,244,393 | A | 4/1966 | Wallerstein, Jr. |
| 3,638,933 | A | 2/1972 | Burnette et al. |
| 4,113,223 | A | 9/1978 | Kakizaki |
| 4,772,109 | A | 9/1988 | Cutburth et al. |
| 4,934,671 | A | 6/1990 | Laninga et al. |
| 6,083,333 | A | 7/2000 | Van Beers et al. |
| 6,232,736 | B1 | 5/2001 | Bullen |
| 6,347,458 | B1 | 2/2002 | Kaczynski |
| 6,442,851 | B1 * | 9/2002 | Botos et al. ................ 33/1 N |

\* cited by examiner

*Primary Examiner*—Diego Gutierrez
*Assistant Examiner*—Tania Courson
(74) *Attorney, Agent, or Firm*—Davis & Bujold PLLC

(57) ABSTRACT

A goniometer comprising a rotor and a support base having therebetween three or four balls or rollers constrained to follow arcuate paths to provide rotation of the rotor, relative to the support base, about an axis of rotation external to the rotor, the balls being constrained to be spaced apart in at least two dimensions to ensure a three point spaced contact with the rotor and the support base.

14 Claims, 5 Drawing Sheets

GONIOMETER

This is a Continuation-in-Part of International Application No. PCT/US02/02648 filed Jan. 30, 2002 which designates the United States of America and which claims priority from U.S. patent application Ser. No. 60/267274 filed Feb. 8, 2001.

FIELD OF THE INVENTION

This invention relates to goniometers, namely a rotational positioner whose center of rotation is located outside the physical boundaries of the device. It is used for partial rotation of parts too large for the thru hole of a full rotational stage.

BACKGROUND OF THE INVENTION

Linear micropositioners are known e.g. from U.S. Pat. No. 3,046,006 and arcuate rolling bearings in which balls, controlled by cages, roll in opposed arcuate gothic arch shaped tracks allegedly providing a four-point contact surface are known e.g. from U.S. Pat. No. H539. Goniometers are also known with current designs typically comprising stages, mounted for limited rotation, controlled by i.e. arcuate dovetail mating grooves or arcuate cross-roller arrangements with cooperating V-grooves. These arrangements do not provide negligible eccentricity coupled with smooth sensitive action as is required i.e. for fiber optic alignment.

OBJECTS OF THE INVENTION

An object of the present invention is to provide a number of designs of goniometers which overcome shortcomings of current designs.

SUMMARY OF THE INVENTION

The design is an improvement over the current designs where shorter rotational travels (minor adjustments, 3–20°) and smooth sensitive and repeatable action are required, but exact long range eccentricity and load capacity are not, such as in fiberoptic alignment. The present invention provides goniometers which are considerably cheaper, and possibly better than using precision roller ways. It employs three or four bearing balls, two riding in counter-v-grooves at least one of which is a V-groove opposed to a non-constraining flat surface, to give complete kinematic stability in every aspect except rotation.

The design with the three ball bearings is the simplest and this affords a three-point contact for low load requirements.

The four-ball version allows perfect four-point contact, which is not achievable in the linear stage as patented (see U.S. Pat. No. 3,046,006). This is because the rotor is free to rotate on its axis normal to the axis of rotation of the device until all four points are touched simultaneously.

The invention provides a goniometer comprising a rotor and a support base having therebetween four balls constrained to follow arcuate paths to provide rotation of the rotor, relative to the support base, about an axis of rotation external to the rotor, the four balls being constrained to be spaced apart in at least two dimensions with at least one ball thereof being supported to adjust its position to ensure a four point spaced apart support contact between the rotor and the support base.

The invention also provides a goniometer comprising a rotor and a support base having therebetween three balls constrained to follow arcuate paths to provide rotation of the rotor, relative to the support base, about an axis of rotation external to the rotor, the three balls being constrained to be spaced apart in at least two dimensions to ensure a three point spaced contact with the rotor and the support base.

A possible further version employs pre-fabricated bearing races, cut into sections for partial rotation, as separate parts attached to receiving areas in the goniometer body, rather than machining them right in. This allows the design to eliminate the third groove pair, while the second groove pair manages its former operation by having the attributes of both groove pairs built into one.

Another embodiment, using the four ball system, is one in which the cylinder pair is "very long as compared to the diameter, and also in 2 sections. This would allow a very lightweight off-axis tilt table.

According to the invention there is provided a goniometer comprising a rotor and a support base having therebetween at least three balls constrained to at least two arcuate paths to allow rotation of the rotor, relative to the support base, about an axis of rotation external to the rotor, the balls being constrained to be spaced apart in at least two dimensions arranged in said arcuate paths to ensure at least a three point spaced contact of the rotor with the support base.

Preferably there are two parallel spaced apart said arcuate grooves, at least one said arcuate groove being formed by facing cooperating V-grooves, one defined by the rotor and the other defined by the support base, retaining two said balls in spaced apart relationship in laterally constrained contact with said V-grooves.

Four balls may be provided, between the rotor and the support base, constrained to follow arcuate paths to allow said rotation of the rotor, relative to the support base, the four balls being constrained to be spaced apart in at least two dimensions with at least one ball thereof being supported to allow self adjustment of its position to ensure a four point spaced apart support contact between the rotor and the support base; preferably there are first, second and third said arcuate paths, the first and second said arcuate paths being spaced apart and each defined by an arcuate V-groove defined one of the rotor and the support base and an arcuate flat surface defined by the other of the rotor and support base and the third arcuate path being defined by facing cooperating arcuate V-grooves located adjacent said first arcuate path, two said balls being disposed and constrained in spaced relationship in the second said arcuate path in contact with the rotor and the support base, a third said ball being disposed and constrained in said first arcuate path in contact with the rotor and support base and the fourth said ball being disposed in said third arcuate path wherein the said fourth ball is free to move along said third arcuate path to allow said self adjustment to a position to ensure said four point spaced apart support contact.

In another embodiment, four balls between the rotor and the support base, are constrained to follow arcuate paths to allow said rotation of the rotor, relative to the support base, the four balls being constrained to be spaced apart in at least two dimensions wherein there are first and second said spaced apart arcuate paths each defined by an arcuate V-groove defined by one of the rotor and support base and a non-constraining arcuate flat surface defined by the other of the rotor and support base, two said balls being disposed in spaced relationship in each arcuate path in contact with the rotor and the support base arranged to ensure a four point spaced apart support contact between the rotor and the support base.

In another embodiment, four balls, between the rotor and the support base, are constrained to follow arcuate paths to allow said rotation of the rotor, relative to the support base, the four balls being constrained to be spaced apart in at least two dimensions wherein there are first and second said spaced apart arcuate paths, the first said arcuate path being defined by an arcuate V-groove defined by one of the rotor and support base and a non-constraining arcuate flat surface defined by the other of the rotor and support base, two said balls being disposed in spaced relationship in each arcuate path in contact with the rotor and the support base with the two balls disposed in the second arcuate path being constrained by opposed V-grooves forming the second arcuate path, thereby to ensure a four point spaced apart support contact between the rotor and the support base. Longitudinal movement of the rotor on the support base parallel to axis of rotation may be controlled by a lateral support arrangement.

In another embodiment, a rotor and a support base have therebetween three balls constrained to follow arcuate paths to provide rotation of the rotor, relative to the support base, about an axis of rotation external to the rotor, the three balls being constrained to be spaced apart in at least two dimensions to ensure a three point spaced contact with the rotor and the support base.

In a preferred three ball embodiment, three balls, between the rotor and the support base, are constrained to follow arcuate paths to allow said rotation of the rotor, relative to the support base, the three balls being constrained to be spaced apart in at least two dimensions wherein there are first and second said spaced apart arcuate paths, the first said arcuate path being defined by an arcuate V-groove defined by one of the rotor and support base and a non-constraining arcuate flat surface defined by the other of the rotor and support base, one said ball being disposed in the first said arcuate path in contact with the rotor and the support base and two balls being disposed spaced apart in the second arcuate path constrained by opposed V-grooves forming the second arcuate path, thereby to ensure a three point spaced apart support contact between the rotor and the support base.

In yet another four ball embodiment the goniometer has a rotor and support base each defining a single arcuate surface which are complimentary and together define an arcuate space with four balls therein, the four balls being constrained to at least two arcuate paths by a cage common to all four balls.

BRIEF DESCRIPTION OF THE DRAWINGS

Various embodiments of the invention will now be described, by way of example, with reference to the accompanying drawings, in which.

DESCRIPTION OF PREFERRED EMBODIMENTS

Figure 12:
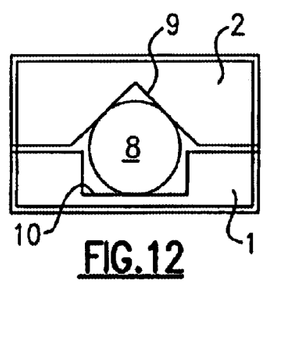
Figure 13:
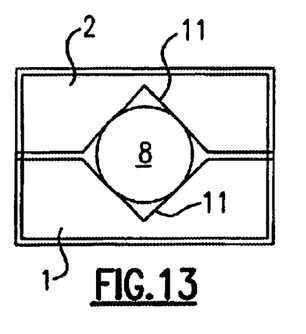

Referring to FIGS. 1–5 a rotor 1 is supported for limited rotation by a base 2. Through holes 3 are provided in the rotor 1 to allow access to base mounting holes 4 by which screws may mount the base 2 to a support structure. In this embodiment three parallel arcuate tracks 5, 6 and 7 engage four balls 8 with tracks 5 and 6 having opposed arcuate surfaces as shown in FIG. 12 and track 7 having an arcuate surface as shown in FIG. 13. In this arrangement the tracks 5 and 6 comprise a arcuate V-groove 9 in base 2 laterally locating the associated balls 8 and in engagement with a flat matching arcuate surface 10 defined by rotor 1 and track 7 has opposed arcuate V-grooves 11 laterally locating the associated ball 8 and in engagement with each other freedom of movement along these grooves as hereinafter described. Three of the balls 8 are arranged with two spaced apart in track 5 and one in track 6 all three being located by cages 15 while the fourth ball 8 is located in track 7 and is free to move along track 7 to find a position in which all four balls touch and support the rotor 1 on the base 2. By this means a smooth sensitive stable high load non-eccentric stage with a movement range typically of about 10° about the axis of rotation of the rotor is provided.

Figure 1:
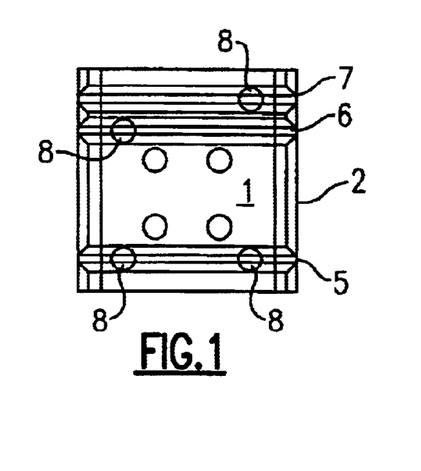
FIG. 1 is a diagrammatic top view of a first embodiment of a four ball goniometer according to the present invention.
Figure 2:
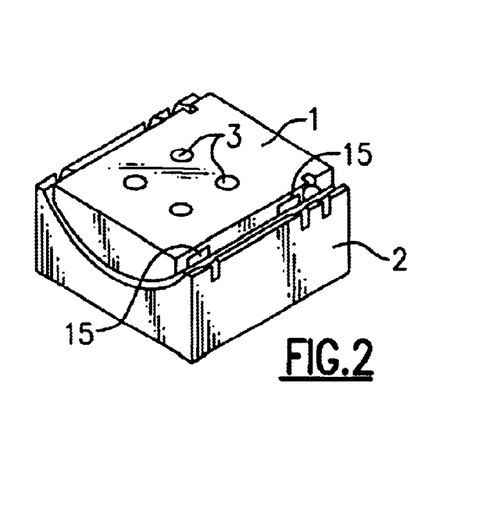
FIG. 2 is a perspective view of the embodiment of FIG. 1.
Figure 3:
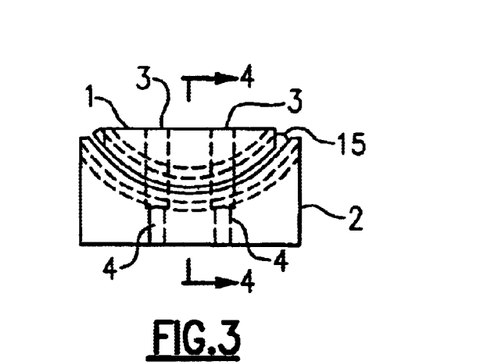
FIG. 3 is a diagrammatic side elevation of the embodiment of FIG. 1.
Figure 4:
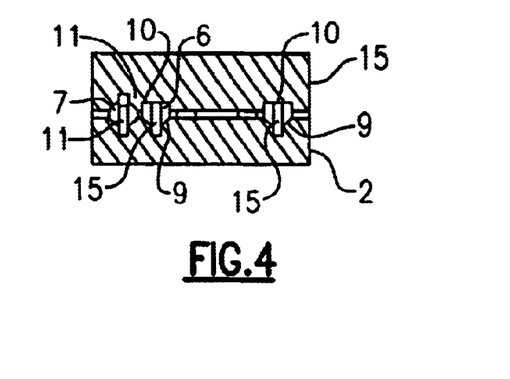
FIG. 4 is a cross-section taken on section line 4—4 of FIG. 3.
Figure 5:
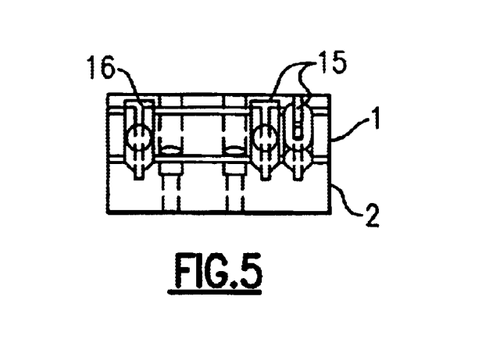
FIG. 5 is a diagrammatic end elevation of the embodiment of FIG. 1.
Figure 6:
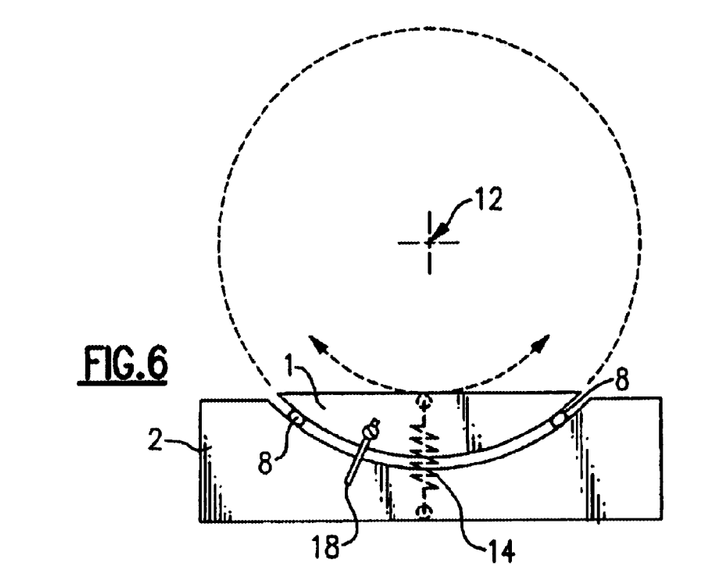
FIG. 6 is a diagrammatic side elevation of a second embodiment of a four-ball goniometer according to the present invention.
Figure 7A:
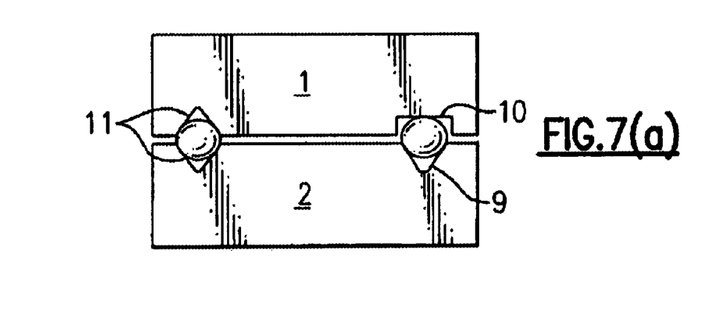
FIG. 7(a) is an illustrative cross-section of the arcuate groove arrangement of the embodiment of FIG. 6.
Figure 7B:
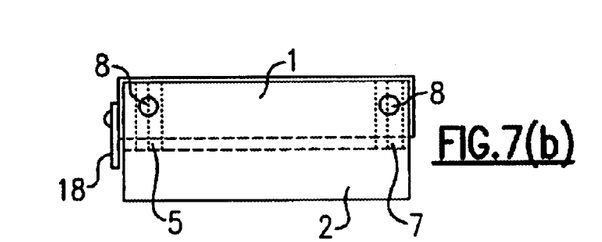
FIG. 7(b) is a diagrammatic end elevation of the second embodiment of FIG. 6.
Figure 8:
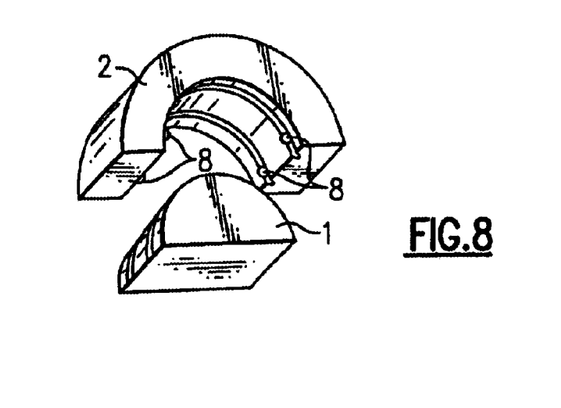
FIG. 8 is an illustrative inverted perspective view showing the arcuate grooves and four balls of the embodiment of FIG. 6.

FIGS. 6–8 refer to an alternative two track 17 arrangement which may be substituted for the three track arrangement of FIGS. 1–5. In FIGS. 6–8 one track is as illustrated in FIG. 13 while the other track is as illustrated in FIG. 12. The arcuate flat surface 10 on one side of one of tracks permits the required rotation of the rotor about an axis normal to the axis or rotation 12 to achieve the necessary four point contact of the balls with the rotor 1 and base 2. An actuating mechanism 18 (motorized or manual) is operatively connected to rotor 1 to control movement about the axis 12. A spring 14 engages the rotor 1 and base 2 to bias these together in engagement with the balls 8.

This embodiment provides no adjustment along axis 12.

Figure 9:
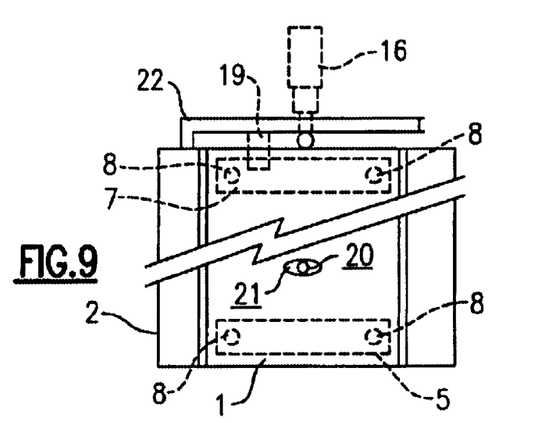
FIG. 9 is a diagrammatic top view of a third embodiment of a four ball goniometer according to the present invention.
Figure 10:
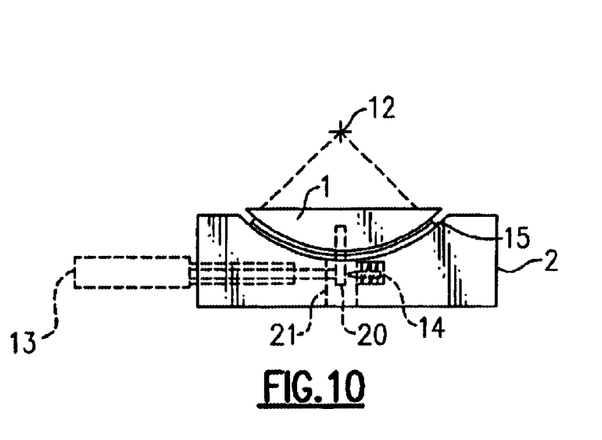
FIG. 10 is a diagrammatic side elevation of the embodiment of FIG. 9.

This four ball 8 arrangement is an example of the track configuration which may be utilized in the four ball embodiment of FIGS. 9 and 10 which illustrates a preferred four ball embodiment allowing an angular travel of the rotor 1 about the axis of rotation 12 typically of about 10° total under the spring 14 biased control of micrometer 13 or other actuator and, optionally, linear travel under the spring 19 biased control of micrometer 16 or other actuator. The spring 25 located in base 2 engages a pin 20 fast with the rotor 1 and moveable in an opening 21 against the bias of spring 25 by micrometer 13 to pivot the rotor 1, relative to the base, about axis 12. The spring 19 engages rotor 1 and a support 22 for micrometer 16 to allow linear movement of the rotor 1 relative to the base 2 along axis 12 against the bias of the spring 19 by operation of the micrometer 16. In the preferred form the arcuate grooves are either or both grooves shown in FIGS. 11 and 14.

To restrain longitudinal movement, a stop/micrometer support 22 may be placed at any convenient point against which the rotor may be pre-loaded. This "stop" may also be a ball placed up against a plate attached to the base, and free to rotate with the rotor Longitudinal movement may even be locked by having one of the balls captivated between 2 transaxial V-grooves, one in the rotor and one in the base 2.

Figure 11:
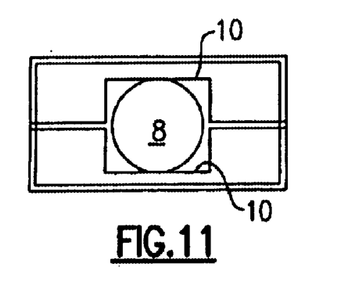
FIGS. 11–14 are illustrative cross-sections of various arcuate groove arrangements referred to with respect to FIGS. 9 and 10 and FIGS. 19 and 20.
Figure 14:
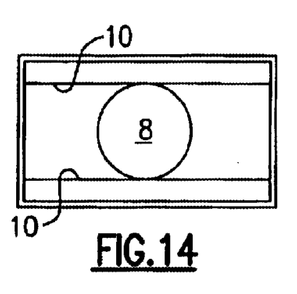
Figure 15:
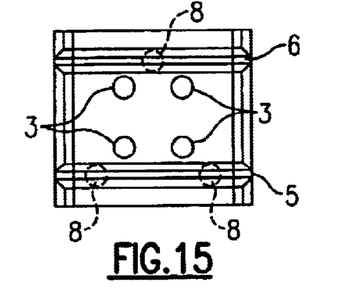
FIG. 15 is a diagrammatic top view of a first embodiment of a three ball goniometer according to the present invention.
Figure 16:
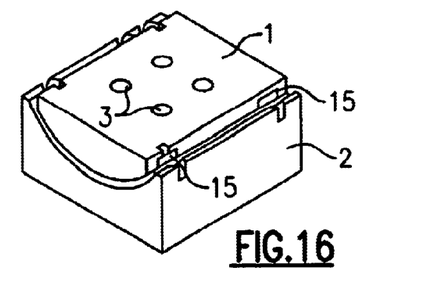
FIG. 16 is a perspective view of the embodiment of FIG. 15.
Figure 17:
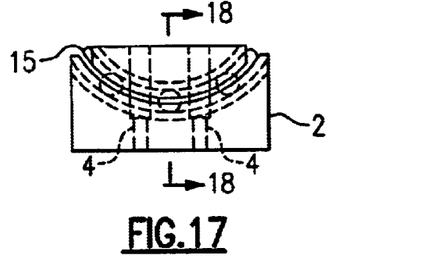
FIG. 17 is a diagrammatic side elevation of the embodiment of FIG. 15.
Figure 18:
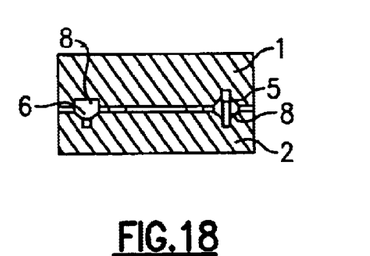
FIG. 18 is a cross-section taken on section line 18—18 of FIG. 17.

FIGS. 11–14 illustrate four groove configurations of which those of FIG. 12 and 13 have already been described above. In addition FIG. 11 illustrates a captivation (1) in which two flat opposed arcuate surfaces 10 having surface defining side walls oppose one another with a ball 8 between the surfaces and FIG. 14 illustrates a captivation (4) comprising two flat arcuate opposed surfaces 10 without surface defining side walls.

Possible configurations are
1) One ball with captivation 3 (FIG. 13), and three balls 8 with captivation 1, 2 or 4 (FIGS. 11, 12 or 14);
2) No longitudinal adjustment, with an external stop. Here four balls are used with any combination of captivations 1 and 4 (FIGS. 11 and 14); and
3) Longitudinal adjustment is provided by micrometer or motor screw with four balls with any combination of captivations 1 and 4 (FIGS. 11 and 14).

Captivation modules may be externally added rather than machined into the base 2 and rotor 1, to provide one or more of the grooves.

Additionally, external bearing housing segments may be transplanted into receivers to form captivation style 3 (FIG. 13), with three of those segments being longitudinally free to find seating for the bearings, then i.e. bonded into those seating places as found.

Any combinations of these arrangements may be used.

Referring now to the three ball embodiments, reference is first made to FIGS. 15–18 in which a rotor 1 is supported for limited rotation by a base 2. Through holes 3 are provided in the rotor 1 to allow access to base mounting holes 4 by which screws may mount the base 2 to a support structure. In this embodiment two parallel arcuate tracks 5 and 6 engage three balls 8 with tracks 5 and 6 having opposed arcuate surfaces as shown in FIGS. 12 and 13 respectively. The balls 8 two spaced apart in track 5 (FIG. 13) and one located centrally in track 6 (FIG. 12) are located by cages (15). By this means a smooth sensitive stable non-eccentric stage with a movement range typically of about 10° about the axis of rotation 12 of the rotor 1 is provided.

Figure 19:
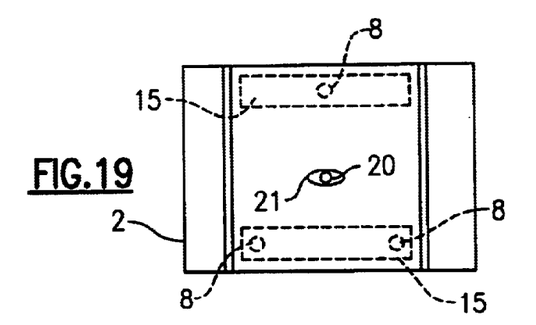
FIG. 19 is a diagrammatic top view of a second embodiment of a three ball goniometer according to the present invention.
Figure 20:
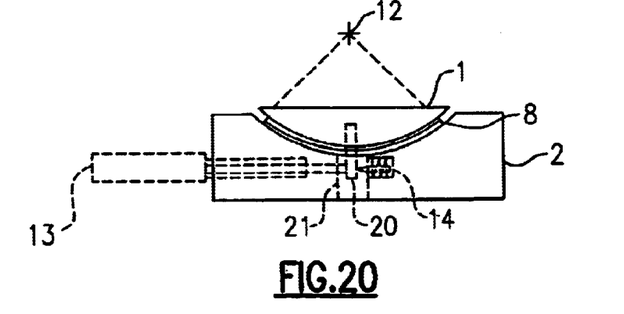
FIG. 20 is a diagrammatic side elevation of the embodiment of FIG. 19.

Now referring to FIGS. 19 and 20 a preferred 3 ball embodiment allowing an angular travel of the rotor 1 about the axis of rotation 12 typically of about 10° total under the spring 14 biased control of micrometer 13 or other actuator. The spring 14 located in base 2 engages a pin 20 fast with the rotor 1 and moveable in an opening 21 against the bias of spring 14 by micrometer 13 to pivot the rotor 1, relative to the base, about axis 12.

The goniometer of FIGS. 19 and 20 may be embodied in the same arrangements as described with reference to FIGS. 11–14 above.

It will be appreciated that in tracks having an arcuate V-groove opposing flat arcuate surface the arcuate V-groove may be located in either the base 2 and the arcuate flat surface on or in the rotor 1 or vise-versa.

Except where freedom of movement of a ball 8 along its associated arcuate groove is required the balls 8 are located by retaining cages (i.e. cage 15 in FIG. 19). Such retaining cages will be well known to those in the bearing arts.

Figure 21:
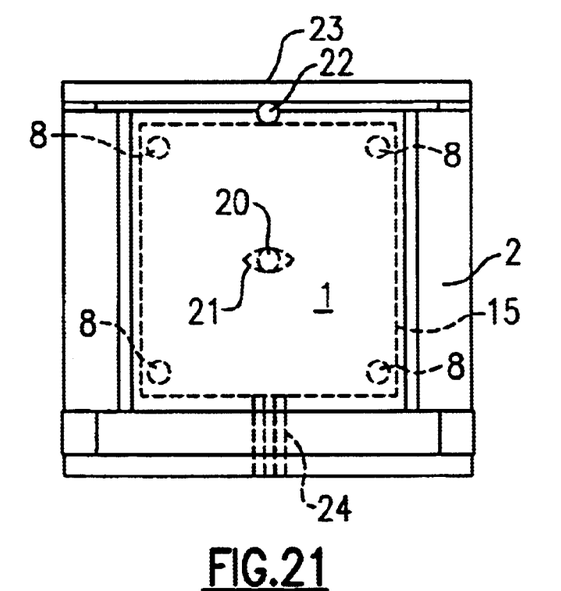
FIG. 21 is a diagrammatic top view of a four ball grooveless and trackless goniometer.
Figure 22:
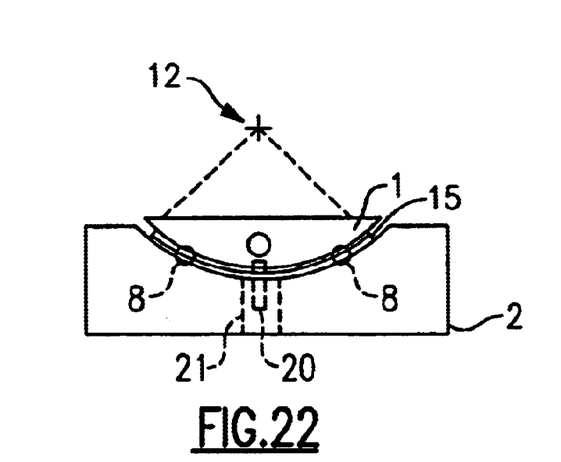
FIG. 22 is a diagrammatic side elevation of the goniometer of FIG. 21.

The goniometer of FIGS. 21 and 22 has four balls 8 unconstrained by grooves or tracks. The balls 8 are retained by a cage 15, common to all four balls 8, to maintain ball pairs separated at desired spacings. As with the above described embodiments, this embodiment has a rotor 1 supported for limited rotation, about axis 12, on a base 2. As with FIGS. 19 and 20 a stop pin 20, in an opening 21, maybe provided to facilitate manual or motorized actuation. A stop 22 (ball, roller or friction slide) supported by a stop support 23 is provided and a spring 24 is positioned to urge the rotor 1 against the stop support 23 by way of the stop 22. A possible variation permits the use of the track shown in FIG. 11. It will be appreciated that the embodiment of FIGS. 21 and 22 is quite similar to the arrangement suggested by FIG. 14 which illustrates a captivation comprising two opposed flat arcuate surfaces without surface defining side walls.

To restrain longitudinal movement, a stop may be placed at any convenient point against the rotor. This "stop" may be a ball placed up against a plate attached to the base, and free to rotate with the rotor.

As used in this application "balls" shall be construed to include "rollers" in cases where the arcuate flat surfaces as shown in FIGS. 11 and 14 are used.

REFERENCE NUMBERS 1 rotor
2 base
3 through holes
4 base mounting holes
5 arcuate track
6 arcuate track
7 arcuate track
8 balls
9 arcuate V-groove
10 arcuate flat surface
11 arcuate V-grooves
12 axis of motion
13 micrometer
14 spring
15 cages
16 micrometer
17 two tracks
18 actuating mechanism
19 spring
20 pin
21 opening
22 stop
23 stop support
24 spring
25 spring

I claim:

1. A goniometer for providing rotational support to a rotor, comprising: the rotor,
a support base, and
at least three balls disposed between the support base and the rotor to allow rotation of the rotor relative to the support base and about an axis of rotation external to the rotor,
the at least three balls being disposed in at least two arcuate; paths located between the rotor and the support base, each arcuate path being in a plane normal to the axis of rotation and circumferential to the axis of rotation,
each ball of the at least three balls being constrained to a location within an arcuate path and spaced apart in at least two dimensions to provide a point of support between the rotor and the support base,
at least one arcuate path having an arcuate flat surface associated with one of the support base and the rotor so that a ball disposed in the at least one arcuate path having an arcuate flat surface is free to move along the arcuate flat surface to allow self adjustment of the ball to a position to ensure a point of contact between the base support and the rotor along the at least one arcuate path by a rotation of the rotor about an axis normal to the axis of rotation to thereby ensure at least three paints of support between the rotor and the base by contact between the base support and the rotor by each ball.

2. The goniometer of claim 1 for providing rotational support to a rotor, comprising:
two parallel arcuate paths spaced apart along the axis of rotation and including the at least one arcuate path having an arcuate fiat surface, and one arcuate path including a base V-groove associated with the a support base and a cooperating opposing rotor V-groove associated with the rotor, and three bails disposed in the two arcuate paths, including one ball disposed in the at least one arcuate path including an arcuate flat surface, and two balls disposed in the one arcuate path including a base V-groove and a rotor V-groove.

3. The goniometer of claim 2 for providing rotational support to a rotor, wherein the two balls disposed in the one arcuate path including a base V-groove and a rotor V-groove ate constrained therein by a cage.

4. The goniometer of claim 2 for providing rotational support to a rotor, comprising:
four balls disposed in the at least two arcuate paths, including at least one ball disposed in the arcuate path having an arcuate flat surface, wherein the at least one ball disposed in the at least one arcuate path having an arcuate flat surface is free to move along the arcuate flat surface to allow self adjustment of the ball to a position to ensure a point of contact between the base support and the rotor along the at least one arcuate path.

5. The goniometer of claim 1 for providing rotational support to a rotor, comprising:
three parallel arcuate paths spaced apart along the axis of rotation, including
two arcuate paths having an arcuate flat surface associated with one of the rotor and the support base, and
one arcuate path including a base V-groove associated with the support base and a cooperating opposing rotor V-groove associated with the rotor, and
four balls disposed in the three arcuate paths, including at least one ball disposed in the arcuate path including a base V-groove and a rotor V-groove.

6. The goniometer of claim 5 for providing rotational support to a rotor, wherein the balls disposed in the arcuate paths having an arcuate flat surface are constrained therein by cages.

7. The goniometer of claim 5 for providing rotational support to a rotor, wherein the balls disposed in the two arcuate paths having arcuate flat surfaces are free to move along the arcuate flat surfaces to allow self adjustment of the balls to positions such that each bail has a point of contact between the base support and to rotor along one of the two arcuate paths having arcuate fiat surfaces to thereby ensure four points of support between the rotor and the base by corresponding contact by each ball between the base support and the rotor.

8. The goniometer of claim for providing rotational support to a rotor, comprising:
two parallel arcuate paths spaced apart along the axis of rotation, including
each acuate path having an arcuate fiat surface associated with one of the rotor and the support base and a cooperating opposing V-groove associated with another of the support base and the rotor, and
four balls disposed in the two arcuate paths, including
two balls disposed in each of the two arcuate paths to provide four points of support between the rotor and the base by corresponding contact by each ball between the base support and the rotor.

9. The goniometer of claim 1 for providing rotational support to rotor, comprising:
two parallel arcuate paths spaced apart along the axis of rotation, including
a first acuate path having an arcuate fiat surface associated with one of the rotor and the support base and a cooperating opposing V-groove associated with another of the support base and the rotor, end
a second arcuate path including a base V-groove associated with the support base and a cooperating opposing rotor V-groove associated with the rotor,
four balls disposed in the two arcuate paths, including
two balls disposed in each of the two arcuate paths to provide four points of support between the rotor and the base by corresponding contact by each ball between the base support and the rotor, wherein
the two balls disposed in the first arcuate path are free to move along the arcuate flat surface to allow self adjustment of the balls to positions such that each ball has a point of contact between the base support and the rotor to thereby ensure four points of support between the and the base.

10. The goniometer of claim 1 for providing rotational support to a rotor, further comprising a longitudinal movement device for controlling movement of the rotor along the axis of rotation.

11. The goniometer of claim 1 for providing rotational support to a rotor, wherein the longitudinal movement device further comprises at least one of:
a lateral support bearing against a traverse surface of the rotor,
a rotatable element mounted in a fixed position relative to the support base and rotatably bearing on a transverse surface of the rotor,
a micrometer connected between the support base and the rotor to selectably determine the position of the rotor along the axis of rotation,
a resilient element connected between the support base and the rotor to resiliently constrain the position of the rotor along the axis of rotation, and an arcuate path including a base V-groove associated with the support base and a cooperating opposing rotor V-groove associated with the rotor and a ball contained within the arcuate path to constrain the movement of the rotor along the axis of rotation.

12. The goniometer of claim 1 for providing rotational support to a rotor, comprising two parallel arcuate paths spaced apart along the axis of rotation, including a first acuate path having an arcuate flat surface associated with one of the rotor and the support base and a cooperating opposing V-groove associated with another of the support base and the rotor, and a second arcuate path including a base V-groove associated with the support base and a cooperating opposing rotor V-groove associated with the rotor, two balls disposed in the second arcuate path to allow rotation of the rotor about the axis of rotation relative to the support base and to constrain movement of the rotor relative to the support base along the axis of rotation, and a ball disposed in the first arcuate path and free to move along the arcuate flat surface to allow self adjustment of the ball to a position such that the ball has a point of contact between the base support and the rotor to thereby ensure three points of support between the rotor and the base.

13. The goniometer of claim 1 for providing rotational support to a rotor, wherein the arcuate flat surface of the at least one arcuate path associated with one of the support base and the rotor is of a width along the axis of rotation of the rotor to permit a rotation of the rotor about an axis normal to the axis or rotation to achieve the at least three points of support between the rotor and the base by corresponding contact between the base support and the rotor by each ball.

14. A goniometer for providing rotational support to a rotor, comprising: the rotor, a support base, and at least three balls disposed in at least two arcuate paths located along an arcuate plane between corresponding opposing arcuate surfaces of the rotor and support base to allow rotation of the rotor relative to the support base and about an axis of rotation external to the rotor, the arcuate faces of the rotor and support base and the arcuate plane being circumferential to and extending along the axis of rotation and each arcuate path being in a plane normal to the axis of rotation and circumferential to the axis of rotation, and a cage located along the arcuate plane and between the corresponding opposing arcuate surfaces of the rotor and support base and constraining each ball of the at least three balls to a corresponding location along the arcuate paths, wherein the at least three balls are spaced apart in at least two dimensions along the arcuate plane to provide at least three points of support between the rotor and the base by corresponding contact by each bail between the base support and the rotor.

* * * * *